United States Patent
Vasilescu

(10) Patent No.: US 8,494,712 B2
(45) Date of Patent: Jul. 23, 2013

(54) COUPLING BETWEEN THERMAL ENGINE AND AIR CONDITIONING COMPRESSOR OF AUTOMOTIVE VEHICLE

(75) Inventor: Claudiu Vasilescu, Paris (FR)

(73) Assignee: Valeo Equipments Electriques Moteur, Creteil (FR)

(*) Notice: Subject to any disclaimer, the term of this patent is extended or adjusted under 35 U.S.C. 154(b) by 789 days.

(21) Appl. No.: 12/516,924

(22) PCT Filed: Dec. 13, 2007

(86) PCT No.: PCT/FR2007/052507
§ 371 (c)(1),
(2), (4) Date: Dec. 22, 2009

(87) PCT Pub. No.: WO2008/078047
PCT Pub. Date: Jul. 3, 2008

(65) Prior Publication Data
US 2010/0145573 A1 Jun. 10, 2010

(30) Foreign Application Priority Data
Dec. 15, 2006 (FR) ...................................... 06 55557

(51) Int. Cl.
*B60K 6/46* (2007.10)
*B60K 6/50* (2007.10)
(52) U.S. Cl.
USPC .......................................... 701/36; 180/65.27

(58) Field of Classification Search
None
See application file for complete search history.

(56) References Cited

U.S. PATENT DOCUMENTS

| 5,656,916 | A  | * | 8/1997  | Hotta ................................ 320/160 |
| 5,755,303 | A  |   | 5/1998  | Yamamoto et al. |
| 6,048,288 | A  | * | 4/2000  | Tsujii et al. ........................ 477/5 |
| 6,668,953 | B1 |   | 12/2003 | Reik et al. |
| 6,745,117 | B1 |   | 6/2004  | Thacher et al. |
| 7,584,626 | B2 | * | 9/2009  | Bellero et al. .................. 62/236 |
| 2003/0094317 | A1 |   | 5/2003 | Takizawa et al. |
| 2003/0116368 | A1 |   | 6/2003 | Winkelman et al. |
| 2003/0213252 | A1 | * | 11/2003 | Kuribayashi ................... 62/133 |
| 2004/0116227 | A1 |   | 6/2004 | Fujioka et al. |
| 2005/0193754 | A1 | * | 9/2005 | Chang et al. ..................... 62/236 |

OTHER PUBLICATIONS

Hanyu et al., "A Study of the Power Transfer Systems for HEVs," 2006 SAE World Congress, No. 2006-01-0668, Mar. 4, 2006, p. 7; table 3.

* cited by examiner

*Primary Examiner* — Michael J Zanelli
(74) *Attorney, Agent, or Firm* — Berenato & White, LLC

(57) ABSTRACT

A hybrid drive of a compressor (3) for an air conditioning unit in an automotive vehicle with a thermal engine, which is implemented by a coupling assembly including a rotating electric machine (2) adapted to be mechanically coupled to the thermal engine and to the compressor. First disengageable coupling assembly (6) are provided for connecting the rotating electric machine to the thermal engine, and second coupling assembly (8) are provided for coupling the rotating electric machine to the compressor.

11 Claims, 3 Drawing Sheets

COUPLING BETWEEN THERMAL ENGINE AND AIR CONDITIONING COMPRESSOR OF AUTOMOTIVE VEHICLE

CROSS-REFERENCE TO RELATED APPLICATIONS AND CLAIM TO PRIORITY

This application relates to International Application No. PCT/FR2007/052507 filed Dec. 13, 2007 and French Patent Application No. 0655557 filed Dec. 15, 2006, of which the disclosures are incorporated herein by reference and to which priority is claimed.

TECHNICAL FIELD OF THE INVENTION

The present invention relates to coupling assemblies for thermal engine vehicles having an air conditioning unit and more particularly to vehicles equipped with a micro-hybrid-type stop system which stops the thermal engine when the vehicle has stopped, for example a "Stop & Start™"-type system.

More particularly, the invention relates to a coupling assembly for a motor vehicle including a thermal engine and a compressor of an air conditioning unit of said vehicle. Such a coupling assembly can be part of the engine assembly of the vehicle.

DESCRIPTION OF RELATED ART

In an engine assembly of the known type, the compressor of an onboard air conditioning unit is rotated by the thermal engine. However, such a coupling produces an excess consumption of fuel, of up to 30%, and results in more polluting gases (NOx, CO, etc) being discharged. Furthermore, the compressor cannot be rotated at more than 9000 revolutions/minute, and this imposes constraints with regard to the reduction ratio of the coupling.

Moreover, it is known to use an electric motor which is dedicated to the controlled driving of the compressor and fed by the battery of the vehicle. However, the compressor requires a power of approximately 3 kW, which is a high load for the battery and raises operational problems, in particular when starting the air conditioning, when high power is required.

Furthermore, vehicles equipped with a "Start & Stop™" switch off the thermal engine when the vehicles have stopped (red lights, stops, etc), which prevents any use of the thermal engine at these moments and therefore of the air conditioning if this is dependent on a compressor connected to the thermal engine.

In particular, the aim of the invention is to overcome these disadvantages of the prior art.

SUMMARY OF THE INVENTION

To this end, the present invention proposes a coupling assembly between the thermal engine and the air conditioning compressor which enables the consumption of fuel and therefore the discharge of polluting gases to be reduced, while providing optimal operation of the compressor particularly during the stages when the thermal engine has stopped, in particular when the passenger compartment is already air-conditioned by the air conditioning. The electric motor can also complement other air-conditioning devices, such as passive type devices that form a cool reserve that is released when the thermal engine is stopped.

Thus, a first aspect of the invention relates to a coupling assembly between a thermal engine and a compressor of an air conditioning unit of a motor vehicle, including:
   a rotating electric machine that can operate in motor mode;
   first disengageable coupling means adapted for coupling the compressor to the thermal engine; and
   second coupling means adapted for coupling the compressor to the rotating electric machine.

As a result of these arrangements, the compressor can be driven in a hybrid manner, i.e. selectively by the thermal engine or by the rotating electric machine independently of one another, such that the consumption of fuel and the polluting emissions are reduced and that the compressor is actuated by the electric motor when the engine is stopped.

The electric motor can be a low-power motor, i.e. less than 1.5 kW, for example 500 W to 1 kW, since it only operates when the thermal engine has stopped, during which time it only has to provide approximately 1 kW for around 2 min.

In various embodiments of the engine assembly according to the invention, one or more of the following devices may optionally also be used:
   where the first and second disengageable coupling means can be controlled independently; it is therefore possible to switch the rotation of the compressor from the thermal engine to the electric motor and vice versa to maintain a temperature of the passenger compartment that is already air-conditioned at a sufficient comfort level for a sufficient period of time.
   the rotating electric machine is adapted for operating in motor mode and for providing a mechanical energy to the thermal engine, that is suitable for starting the thermal engine; the electric motor is a starter.
   A dedicated electric drive is no longer necessary, and this allows for a saving in space in the engine compartment, and for a reduction in costs of the air conditioning unit.
   the rotating electric machine is adapted for operating, furthermore, in generator mode in order to transform a mechanical power provided by the thermal engine into an electrical power; the electric motor is a starter-alternator.
   the rotating electric machine is adapted to be arranged in a manner where it is attached to the air conditioning unit of the vehicle;
   the rotating electric machine is adapted to be coupled to the thermal engine via a transmission unit;
   the rotating electric machine is adapted to be connected to the compressor via a transmission unit;
   the transmission unit includes at least one of the following devices: an epicyclic gear train, a fixed reduction ratio transmission, a continuously variable reduction ratio transmission, a gear box;
   the transmission unit is an epicyclic gear train, including an annular gear, a sun gear and planet gears connected to an output shaft, the annular gear forming a rotor of the rotating electric machine, the sun gear being adapted to be mechanically connected to the compressor.

A second aspect of the present invention relates to an engine assembly for a vehicle having a thermal engine and an air conditioning unit with a compressor, including a coupling unit according to the first aspect, for the coupling between said thermal engine and said compressor.

A third aspect of the present invention further relates to a method for controlling an engine assembly for a thermal engine vehicle including:
   a thermal engine for driving the vehicle;
   a rotating electric machine and,
   a compressor of an air conditioning unit of the vehicle.

The method includes:

a first mode of operation, wherein the thermal engine provides a mechanical power to the compressor; and a second mode of operation wherein the rotating electric machine, operating in motor mode, provides a mechanical power to the compressor in a manner that is mechanically independent of the thermal engine. This second mode of operation is used when the vehicle has stopped, with the thermal engine in the stop position.

In one embodiment, the method includes the successive steps of:

a) providing a mechanical power from the rotating electric machine to the thermal engine in order to start the thermal engine by means of the rotating electric machine which is mechanically coupled to the thermal engine;

b) providing a mechanical power from the thermal engine to the compressor;

c) providing a mechanical power solely from the rotating electric machine to the compressor, in the stop stage of the thermal engine.

As a result of these arrangements, the compressor can be rotated in a hybrid manner. When the compressor requires a high power, i.e. basically when starting the compressor, the thermal engine provides the necessary mechanical power. When the thermal engine has stopped, the rotating electric machine drives the compressor, and enables the operation of the compressor.

Preferably, step (c) is repeated successively over ranges of a first duration, said ranges being spaced apart by a second duration that is substantially greater than the first duration.

BRIEF DESCRIPTION OF THE DRAWINGS

Other features and advantages of the invention will emerge in the course of the following description of one of the embodiments thereof, which is given by way of non-limiting example, with reference to the appended drawings, wherein.

DESCRIPTION OF PREFERRED
EMBODIMENTS OF THE INVENTION

In the various figures, the same references are given to identical or similar members.

Figure 1:
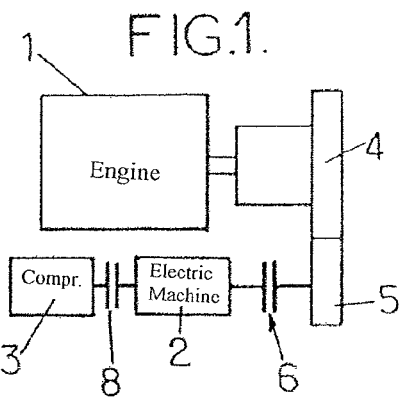
FIG. 1 is a schematic representation of an engine assembly according to a first embodiment in accordance with the invention.

FIG. 1 schematically shows a coupling assembly between a thermal engine 1 equipped with a micro-hybrid-type system such as a "Stop & Start™" system, and a compressor 3 of an air conditioning unit (not shown) of an air-conditioned vehicle, in accordance with a first embodiment of the invention. This coupling assembly includes a rotating electric machine 2.

The electric machine 2 is mechanically coupled to the compressor 3, in order to drive the compression wheel or plate (pistons) via an appropriate first coupling device 8. Preferably, the first coupling device 8 is disengageable, so as to enable the electric machine 2 to be disconnected from the compressor 3 in a controlled manner.

The machine is also mechanically coupled to the thermal engine, for example, by means of a pinion 5 meshing with a crankshaft 4 of the thermal engine 1. The electric machine 2 is more particularly coupled to the pinion via a second disengageable coupling device 6, enabling the electric machine 2 to be disconnected from the thermal engine 1 in a controlled manner.

When the first coupling device 8 is disengageable, the first and second coupling devices 8 and 6, respectively, can be controlled in the open state (i.e. in the disengaged state) or in the closed state (i.e. the engaged state) independently.

Advantageously, the electric machine 2 can be a starter adapted for starting the thermal engine 1. Thus, a dedicated drive for the compressor 3 is eliminated. Furthermore, the starter is a component which, according to conventional techniques, is only used during the starting stage of the vehicle, and is then no longer used. This embodiment is therefore based on a greater use of a component which already exists but is under-used. It can therefore be implemented without additional cost.

In an alternative, it is possible that the electric machine 2 is a rotating machine which can operate in motor mode and which can furthermore operate in generator mode (or alternator mode), for example in order to recover energy during vehicle braking, or to recharge the battery. Such a machine is known as a starter-alternator.

Figure 2:
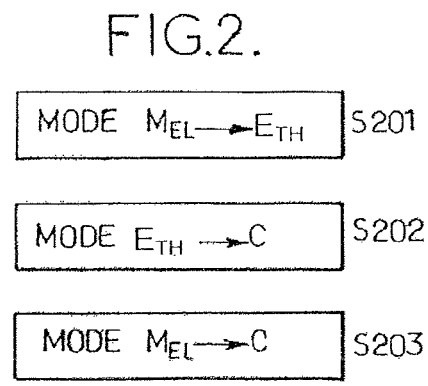
FIG. 2 is a process chart showing a control method in accordance with the invention.

The operation of the coupling assembly according to the first embodiment is illustrated by the process chart of FIG. 2.

In a first stage of operation, the electric motor 2 is used to start the thermal engine 1, at step S201 (MODE $M_{EL} \rightarrow E_{TH}$). In this phase, the electric motor 2 provides a mechanical energy (power) to the thermal engine 1, through the device 6 which is closed.

Once the thermal engine 1 has started, it provides a mechanical power to the compressor 3 in order to cool the vehicle, at step S202 (MODE $E_{TH} \rightarrow C$), through the device 6 which is closed, the electric motor 2 and the device 8 (which is then closed, when it is disengageable). The power of the thermal engine 1 is sufficient to feed the compressor 3 in this stage, when, as already seen, maximum power is required.

Then, either at the end of a pre-determined time, or when the vehicle has been sufficiently cooled by the air conditioning unit, a mode for electrically driving the compressor is entered into, at step S203. For this purpose, the coupling device 6 is open, disconnecting the shaft of the electric motor from the pinion 5. In this step which takes place generally in the moving stage of the vehicle, i.e. when the vehicle is moving, the mechanical power necessary for the operation of the compressor is provided by the electric motor 2 (MODE $M_{EL} \rightarrow C$). In any case, it does not occur at the time of starting the vehicle, which is critical as indicated in the introduction.

This power can furthermore be provided through successive surges, i.e. through a series of periods of short duration in order to adjust the temperature in the passenger compartment.

This mode of operation is particularly suitable for a starter-type electric motor, since this is an electric motor that can, by design, only withstand short stages of operation.

The coupling device 8 connecting the compressor 3 to the electric motor 2 is not necessarily disengageable. Nevertheless, a disengageable device particularly enables the compressor not to be rotated in the case where the electric machine 2 is used in motor mode in order to provide a mechanical power to the thermal engine 1 during the moving stages (for example in the case of a hybrid car, i.e. driven selectively by a thermal engine or an electric motor), or in generator mode in order to produce electric energy from the mechanical energy provided by the thermal engine 1 (for example when the electric machine is an alternator or a starter-alternator).

The various modes of operation are established using the coupling device 6 and the coupling device 8 (when it is disengageable), that are respectively arranged between the thermal engine 1 and the electric machine 2, and between the electric machine 2 and the compressor 3. Thus, for an operation in starter mode or in motor mode (for a hybrid vehicle), the coupling 6 is closed, and the coupling 8 is optionally open, depending on the air conditioning requirements. In alternator mode, likewise, the coupling 6 is closed and the coupling 8 is optionally open, depending on the requirements. In air conditioning mode alone, the coupling 6 is open and the coupling 8 is closed.

Furthermore, the electric machine 2 can be arranged in a manner where it is attached to the air conditioning unit, or to the compressor 3. In this manner, it is cooled with the gas of the compressor or with the evaporator of the air conditioning unit which absorbs heat and produces cold.

In both cases, effective cooling of the electric machine 2 is provided, which enables a starter-type electric machine to be operated for longer periods of operation.

Figure 3:
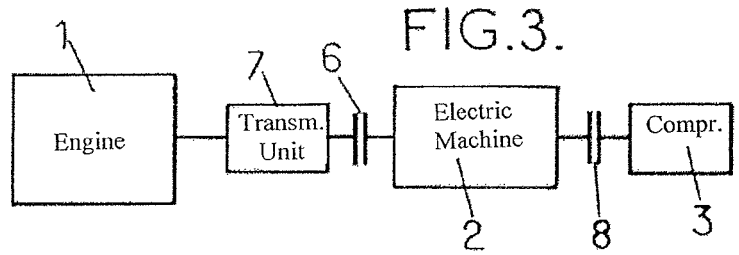
FIG. 3 is a schematic representation of an engine assembly according to a second embodiment in accordance with the invention.

As illustrated in FIG. 3, a coupling assembly in accordance with a second embodiment further includes a transmission unit 7, for example a continuously variable reduction ratio transmission (or CVT meaning "Continuously Variable Transmission") unit, connecting the thermal engine 1 to the electric machine 2. r will refer to the reduction ratio. Thus, the rotation speed of the various members that are operating can be adjusted. Indeed, when the thermal engine 1 provides a mechanical power to the compressor 3 via the electric machine 2, the speed of the engine can be modified according to the driving. Nevertheless, the reduction ratio of the CVT unit can be adjusted in order to maintain the operation of the compressor about a desired operating point.

Figure 4:
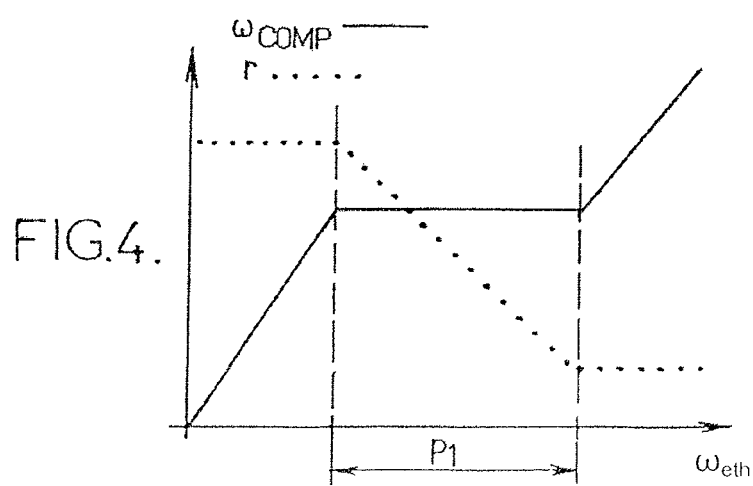
FIG. 4 is a graph showing the development of the rotation speeds of the members of the engine assembly of the second embodiment.

As illustrated in FIG. 4, the ratio r can be adjusted over a determined range of operation R1 of angular speed of the thermal engine 1 $\omega_{eth}$ so as to maintain a constant compressor rotation speed $\omega_{COMP}$, independently of the variations in the speed of the thermal engine 1. Thus, an optimal operating point of the compressor can be observed, for example according to a temperature set-point of the air conditioning unit.

When the CVT unit is placed between the thermal engine 1 and the electric machine 2, a reduction in consumption of 1.5% has been noted compared to conventional techniques. To this end, any type of CVT unit can be used, such as pulley, toroidal, or even hook CVT units.

Instead of the CVT unit, it is possible to use any type of known transmission unit, such as an epicyclic gear train, a fixed reduction ratio transmission, or even a gearbox.

According to an alternative, the transmission unit 7, which in this case is a CVT unit, can be placed between the electric machine 2 and the compressor 3. In this configuration, a reduction in consumption of approximately 6% has been noted.

Figure 5:
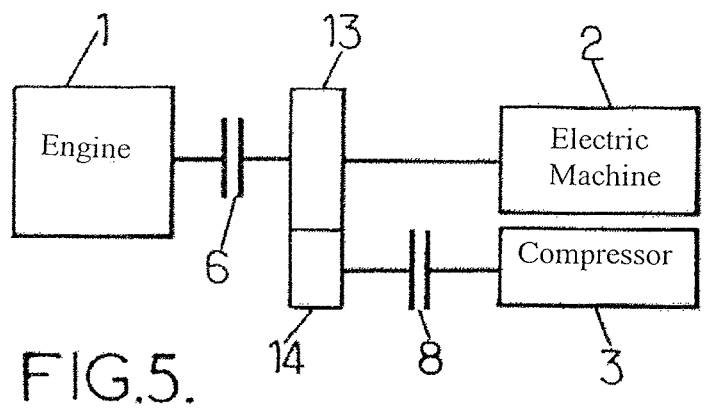
FIG. 5 is a schematic representation of an engine assembly according to a third embodiment in accordance with the invention.

In a third embodiment illustrated by FIG. 5, the shaft of the rotating electric machine 2 can be connected to a first pinion 13, and the shaft of the compressor can be connected via the first coupling device 8 to a second pinion 14, which is meshing with the first pinion 13. The second coupling 6 is inserted between the thermal engine 1 and the first pinion 13. A structure having a more compact architecture is obtained.

Indeed, in order for the engine to provide a mechanical power to the compressor 3, both the second and first coupling devices 6 and 8 are closed. When only the electric machine 2 provides mechanical power to the compressor 3, the second coupling 6 is open and the first coupling 8 is closed.

Figure 6:
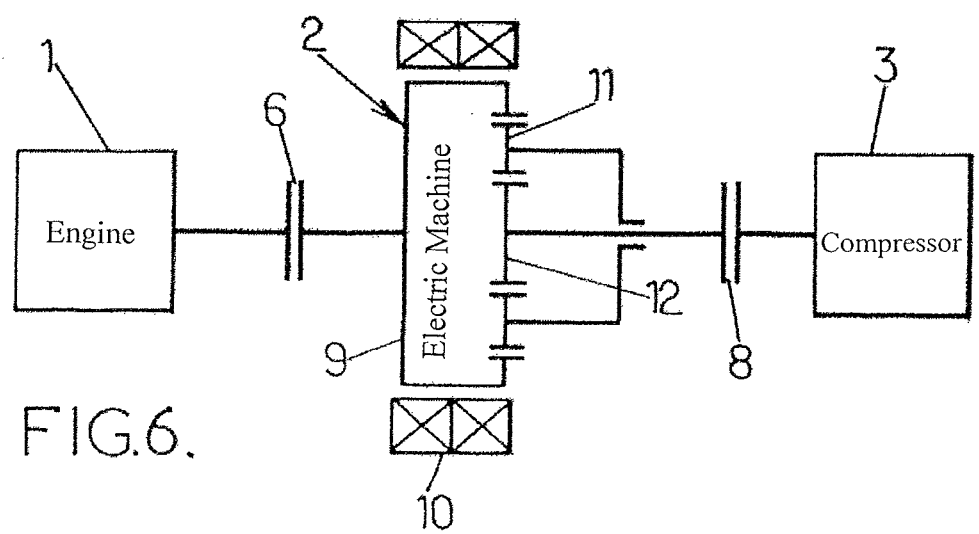
FIG. 6 is a schematic representation of an engine assembly according to a fourth embodiment in accordance with the invention.

Furthermore, according to a fourth embodiment of the invention which is illustrated in FIG. 6, the rotating electric machine 2 can be integrated into a drive device such as an epicyclic gear train. More particularly, the annular gear 9 of the epicyclic gear train can form a rotor of the rotating electric machine 2. Stator windings 10 are provided about the annular gear 9. If the stator is fed, a mechanical power can then be converted into an electric power. When the thermal engine 1 only has to provide the mechanical energy required by the compressor 3, there is no current circulating in these windings.

The epicyclic gear train can also include planet gears 11, cooperating on the one hand with the annular gear 9, and on the other hand with a sun gear 12, which is then connected mechanically to the compressor 3. The planet carrier is optionally connected to the frame.

Thus, a compact structure can be formed for the coupling assembly, comprising a starter-alternator or a reversible motor. Furthermore, the proximity of the compressor 3 enables effective cooling of the rotating electric machine 2.

Figure 7:
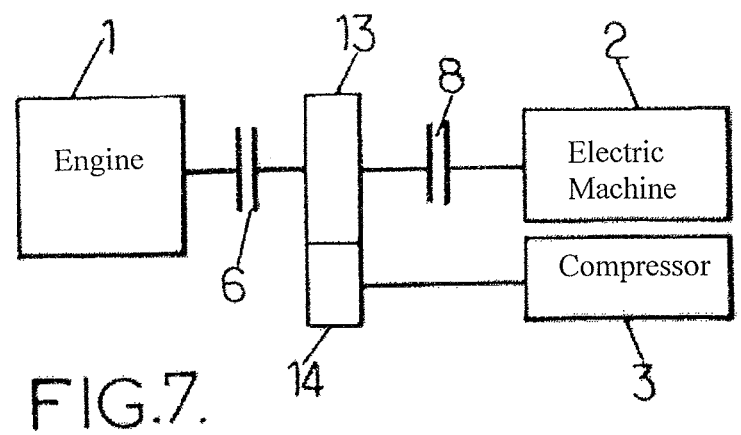
FIG. 7 is a schematic representation of an engine assembly according to a fifth embodiment in accordance with the invention.

According to a fifth embodiment of the invention, which embodiment is shown in FIG. 7, the rotating electric machine 2 can, for example, be a brush motor. The electric machine 2 can be connected to a first pinion 13 via a disengageable coupling 8 and the shaft of the compressor 3 is connected to a second pinion 14. Both pinions 13 and 14 can be replaced with pulleys driven by conventional belts. The coupling 6 is inserted between the thermal engine 1 and the first pinion 13. The rotating machine 2 is only used in the thermal engine 1 stop stage, and it is disengaged during the moving stages, with the compressor then being driven by the thermal engine 1.

In the case of vehicles equipped with a starter-alternator, the strategy is as follows:
- at first start, the electric machine 2 is disengaged while the thermal engine 1 starts,
- during the thermal engine 1 "Stop" stage, the machine 2 preferably starts before the engine 1 stops. This is so that the compressor 3 does not have to be restarted, which would then have a static friction torque that is greater than the dynamic friction torque thereof. This allows electric energy to be saved and means that the machine 2 does not have to be oversized. The machine 2 only runs for the prescribed time, i.e. 1-2 minutes according to the charge state of the battery or of the Ucap that feeds it, so as to keep enough energy to restart the thermal engine 1. If the charge becomes insufficient or if the stop time of the thermal engine 1 exceeds the prescribed time, the machine 2 and the compressor 3 are stopped (in this case, the air conditioning is stopped) or the thermal engine 1 is restarted and the machine 2 is stopped (in this case, the air conditioning continues to operate).

at restart, the machine 2 is stopped prior to starting the thermal engine 1 so as to be able to use the remaining energy for restarting the thermal engine 1. However, the machine 2 could be completely stopped at the time of starting the engine 1 or after according to the charge state of the Ucap or of the battery.

Figure 8:
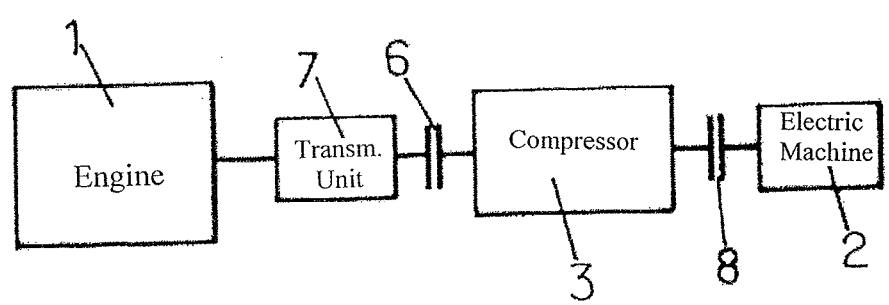
FIG. 8 is a schematic representation of an engine assembly according to a sixth embodiment.

As illustrated in FIG. 8, a coupling assembly in accordance with a sixth embodiment further includes a transmission unit 7, for example a continuously variable reduction ratio transmission (or CVT meaning "Continuously Variable Transmission) unit, connecting the thermal engine 1 to the compressor 3. r will refer to the reduction ratio. Thus, the rotation speed of the various members that are operating can be adjusted. Indeed, when the thermal engine 1 provides a mechanical power to the compressor 3, with the device 6 being closed, the reduction ratio of the CVT unit can be adjusted in order to maintain the operation of the compressor about a desired operating point. When the thermal engine 1 is stopped, the electric motor 2 takes over by closing the device 8.

The gears can be replaced with rollers without necessarily departing from the scope of the present invention.

It should be noted that the arrangements of the various embodiments described above can also be advantageously combined with one another.

The invention claimed is:

1. A coupling assembly between a thermal engine (1) and a compressor (3) of an air conditioning unit of a motor vehicle, including:
   a rotating electric machine (2) adapted to operate in a motor mode;
   a transmission unit;
   a first disengageable coupling device (8) for coupling the compressor to the transmission unit; and
   a second disengageable coupling device (6) for coupling the thermal engine to the rotating electric machine 2 and for coupling the thermal engine (1) to the compressor via the transmission unit and the first disengageable coupling device (8);
   the compressor (3) being provided to be coupled to the thermal engine (1) and the rotating electric machine (2) via the transmission unit.

2. The coupling assembly according to claim 1, wherein the electric machine (2) in the mode has a power that is no greater than 1.5 kW.

3. The coupling assembly according to claim 1, wherein the first disengageable coupling device (8) and second disengageable coupling device (6) are controlled independently.

4. The coupling assembly according to claim 1, wherein the rotating electric machine (2) is adapted for operating in the motor mode and for providing a mechanical energy to the thermal engine (1), that is suitable for starting the thermal engine.

5. The coupling assembly according to claim 1, wherein the rotating electric machine is adapted for operating in generator mode in order to transform a mechanical power provided by the thermal engine (1) into an electrical power.

6. The coupling assembly according to claim 1, wherein the rotating electric machine (2) is adapted to be attached to the air conditioning unit of the vehicle.

7. The coupling assembly according to claim 1, wherein the transmission unit includes at least one of an epicyclic gear train, a fixed reduction ratio transmission, a continuously variable reduction ratio transmission and a gear box.

8. The coupling assembly according to claim 7, wherein the transmission unit is a fixed reduction ratio transmission comprising a first driving wheel (13) and second driving wheel (14); wherein the first driving wheel (13) is directly coupled to the rotating electric machine (2) and the second disengageable coupling device (6); and wherein the second driving wheel (14) is directly coupled to the compressor.

9. The coupling assembly according to claim 8, wherein the first driving wheel (13) and the second driving wheel (14) are pinions.

10. The coupling assembly according to claim 8, wherein the first driving wheel (13) and the second driving wheel (14) are belt pulleys.

11. The coupling assembly according to claim 1, wherein the transmission unit is an epicyclic gear train, including an annular gear (9), a sun gear (12) and planet gears (11) connected to an output shaft, the annular gear (9) forming a rotor of the rotating electric machine (2), the sun gear (9) being adapted to be mechanically connected to the compressor (3).

* * * * *